(12) United States Patent
Muhammad et al.

(10) Patent No.: US 9,891,085 B2
(45) Date of Patent: Feb. 13, 2018

(54) ULTRASOUND FUEL FLOW SENSING AND CONTROL

(71) Applicant: General Electric Company, Schenectady, NY (US)

(72) Inventors: Muddassar Ali Muhammad, Woburn, MA (US); Edward Randall Furlong, Beverly, MA (US); Colin James Mackenzie, Leicester (GB); William James Mailander, Beverly, MA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/028,055

(22) PCT Filed: Oct. 3, 2014

(86) PCT No.: PCT/US2014/059147
§ 371 (c)(1),
(2) Date: Apr. 8, 2016

(87) PCT Pub. No.: WO2015/054079
PCT Pub. Date: Apr. 16, 2015

(65) Prior Publication Data
US 2016/0258798 A1    Sep. 8, 2016

Related U.S. Application Data

(60) Provisional application No. 61/889,552, filed on Oct. 11, 2013.

(51) Int. Cl.
*G01F 1/88* (2006.01)
*F02C 9/26* (2006.01)
(Continued)

(52) U.S. Cl.
CPC .............. *G01F 1/88* (2013.01); *F02C 9/26* (2013.01); *F02C 9/28* (2013.01); *G01F 1/34* (2013.01);
(Continued)

(58) Field of Classification Search
CPC ............. G01F 1/20; G01F 1/66; G01F 1/34
(Continued)

(56) References Cited

U.S. PATENT DOCUMENTS 7,607,359 B2 * 10/2009 Hecht ............... G01F 1/662
73/861.27
2007/0151333 A1 * 7/2007 Paradise ............ F01D 17/08
73/114.35
(Continued)

OTHER PUBLICATIONS

International Search Report and Written Opinion issued in connection with corresponding PCT application No. PCT/US2014/059147 dated Jan. 20, 2015.

*Primary Examiner* — Jewel V Thompson
(74) *Attorney, Agent, or Firm* — General Electric Company; Pamela A. Kachur

(57) ABSTRACT

Methods and apparatus for measuring liquid fuel flows within a conduit are disclosed. An example flow sensor may include a conduit arranged to flow fuel therethrough along a flow axis, the conduit defining a flow area orthogonal to the flow axis. The flow sensor may further include a first transducer arranged to direct a first signal through the conduit proximate the flow area to a second transducer, the second transducer being arranged to direct a second signal through the conduit proximate the flow area to the first transducer, the first transducer being spaced apart from the second transducer by a signal path length, and in a direction parallel to the flow axis by an axial distance. The fuel flow measuring system may further include a processor arranged
(Continued)

to calculate a fuel mass flow rate based on first and second signal transit times, known fuel properties and a fuel temperature.

18 Claims, 11 Drawing Sheets

(51) Int. Cl.
- *G01F 1/34* (2006.01)
- *G01F 1/66* (2006.01)
- *F02C 9/28* (2006.01)
- *G01F 1/44* (2006.01)
- *G01M 15/04* (2006.01)

(52) U.S. Cl.
CPC ............... *G01F 1/44* (2013.01); *G01F 1/662* (2013.01); *G01F 1/663* (2013.01); *G01F 1/667* (2013.01); *F05D 2220/323* (2013.01); *F05D 2260/80* (2013.01); *F05D 2260/83* (2013.01); *F05D 2270/303* (2013.01); *F05D 2270/306* (2013.01); *F05D 2270/821* (2013.01); *G01M 15/042* (2013.01)

(58) Field of Classification Search
USPC .............. 73/861.18, 861.28, 861.27, 861.35, 73/861.42
See application file for complete search history.

(56) References Cited

U.S. PATENT DOCUMENTS

| | | | |
|---|---|---|---|
| 2009/0151472 A1* | 6/2009 | Brown | G01F 1/662 73/861.27 |
| 2011/0271770 A1* | 11/2011 | Wiest | G01F 1/662 73/861.28 |
| 2012/0055263 A1* | 3/2012 | Konzelmann | G01F 1/34 73/861.18 |

* cited by examiner

ULTRASOUND FUEL FLOW SENSING AND CONTROL

CROSS-REFERENCE TO RELATED APPLICATIONS

This application is a national stage application under 35 U.S.C. § 371(c) of prior filed, co-pending PCT application Ser. No. PCT/US2014/059147, filed on Oct. 3, 2014, which claims priority to U.S. Provisional Application Ser. No. 61/889,552, titled "Ultrasound Fuel Flow Sensing and Control" filed Oct. 11, 2013. The above-listed applications are herein incorporated by reference.

BACKGROUND

The subject matter disclosed herein relates generally to fuel flow measuring systems, and, more particularly, to methods and apparatus for measuring liquid fuel flows within a conduit.

Fuel flow measuring systems are critical to many industries including automotive, oil and gas, power and aviation, due to the need to know how much fuel a vehicle or piece of machinery is consuming (or alternatively, to know how much fuel is passing through a pipeline or conduit). In many high mass flow applications, even a small inaccuracy in the fuel flow measurement can result in large revenue losses.

Existing fuel measuring systems may use turbine type meters that spin at a rate proportional to the volumetric flow rate. These types of systems tend to get worn out over time due to the stresses on the turbine bearings. In addition, they can restrict the fuel flow due to the inherent friction associated with spinning the turbine meter. Other types of meters use a flow section or orifice plate and a differential pressure measurement proportional to the flow rate. These types of systems also incur a fuel flow pressure loss. Furthermore, turbine and orifice plate type fuel meters are generally assumed to provide limited accuracy. Venturi-type flow meters can require a lengthy flow section which may not be ideal for many applications where space and/or weight limitations exist. Some conventional ultrasonic flow meters may suffer similar disadvantages.

It is desirable to have a durable, lighter weight fuel flow measuring system with lower pressure losses, which has a greater accuracy and can be utilized with controllers.

BRIEF DESCRIPTION

The solutions are provided by the present disclosure to include example embodiments, provided for illustrative teaching and not meant to be limiting.

An example fuel flow measuring system according to at least some aspects of the present disclosure may include a conduit arranged to flow fuel therethrough generally along a flow axis; a first transducer arranged to direct a first signal through the conduit proximate the flow area to a second transducer, the second transducer being arranged to direct a second signal through the conduit proximate the flow area to the first transducer, the first transducer being spaced apart from the second transducer by a signal path length, the first transducer and the second transducer being spaced apart in a direction parallel to the flow axis by an axial distance; and a processor for calculating a fuel mass flow rate through the conduit based at least in part on a first signal transit time for the first signal to travel from the first transducer to the second transducer, a second signal transit time for the second signal to travel from the second transducer to the first transducer, one or more known fuel flow properties, and a fuel temperature.

An example engine control system according to at least some aspects of the present disclosure may include an electronic engine controller configured to operate at an update rate; a fuel flow measuring system operatively coupled to provide a fuel mass flow rate signal to the electronic engine controller, the fuel flow measuring system comprising a conduit through which fuel can flow, at least one fuel temperature sensor arranged to measure a fuel temperature associated with fuel flowing through the conduit, a first ultrasonic transducer and a second ultrasonic transducer arranged to direct ultrasonic signals through at least a portion of the conduit, the second ultrasonic transducer facing the first ultrasonic transducer, the first and second transducers operating at a measurement interval, and a processor configured to calculate a mass flow rate of fuel through the conduit based at least in part on a first signal transit time for a first signal to travel from the first ultrasonic transducer to the second ultrasonic transducer, a second signal transit time for a second signal from to travel the second ultrasonic transducer to the first ultrasonic transducer, and the fuel temperature. The measurement interval may be substantially the same as or shorter than the update rate of the electronic engine controller.

An example fuel flow sensor according to at least some aspects of the present disclosure may include a conduit arranged to convey fuel therethrough, the conduit comprising, from upstream to downstream, a first conduit portion, a second conduit portion, and a third conduit portion, the second conduit portion comprising a first end and a second end; a first ultrasonic transducer disposed proximate the first end of the second conduit portion; and a second ultrasonic transducer disposed proximate the second end of the second conduit portion; wherein the first conduit portion and the third conduit portion are substantially parallel and the second conduit portion is disposed at a non-zero angle with respect to the first conduit portion and the third conduit portion.

An example fuel flow measuring system according to at least some aspects of the present disclosure may include a conduit arranged to flow fuel therethrough generally along a flow axis, the conduit defining a flow area generally orthogonal to the flow axis; a first transducer arranged to direct a first signal through the conduit proximate the flow area to a second transducer, a third transducer being arranged to direct a second signal through the conduit proximate the flow area to a fourth transducer, the first transducer being spaced apart from the second transducer by a signal path length, the first transducer and the second transducer being spaced apart in a direction parallel to the flow axis by an axial distance; the third transducer being spaced apart from the fourth transducer by a signal path length, the third transducer and the fourth transducer being spaced apart in a direction parallel to the flow axis by an axial distance; and a processor arranged to calculate a fuel mass flow rate through the conduit based at least in part on a first signal transit time for the first signal to travel from the first transducer to the second transducer, a second signal transit time for the second signal to travel from the third transducer to the fourth transducer, one or more known fuel properties and a fuel temperature.

BRIEF DESCRIPTION OF THE DRAWINGS

The subject matter for which patent claim coverage is sought is particularly pointed out and claimed herein. The subject matter and embodiments thereof, however, may be best understood by reference to the following description taken in conjunction with the accompanying drawing figures in which:

DETAILED DESCRIPTION

Figure 1:
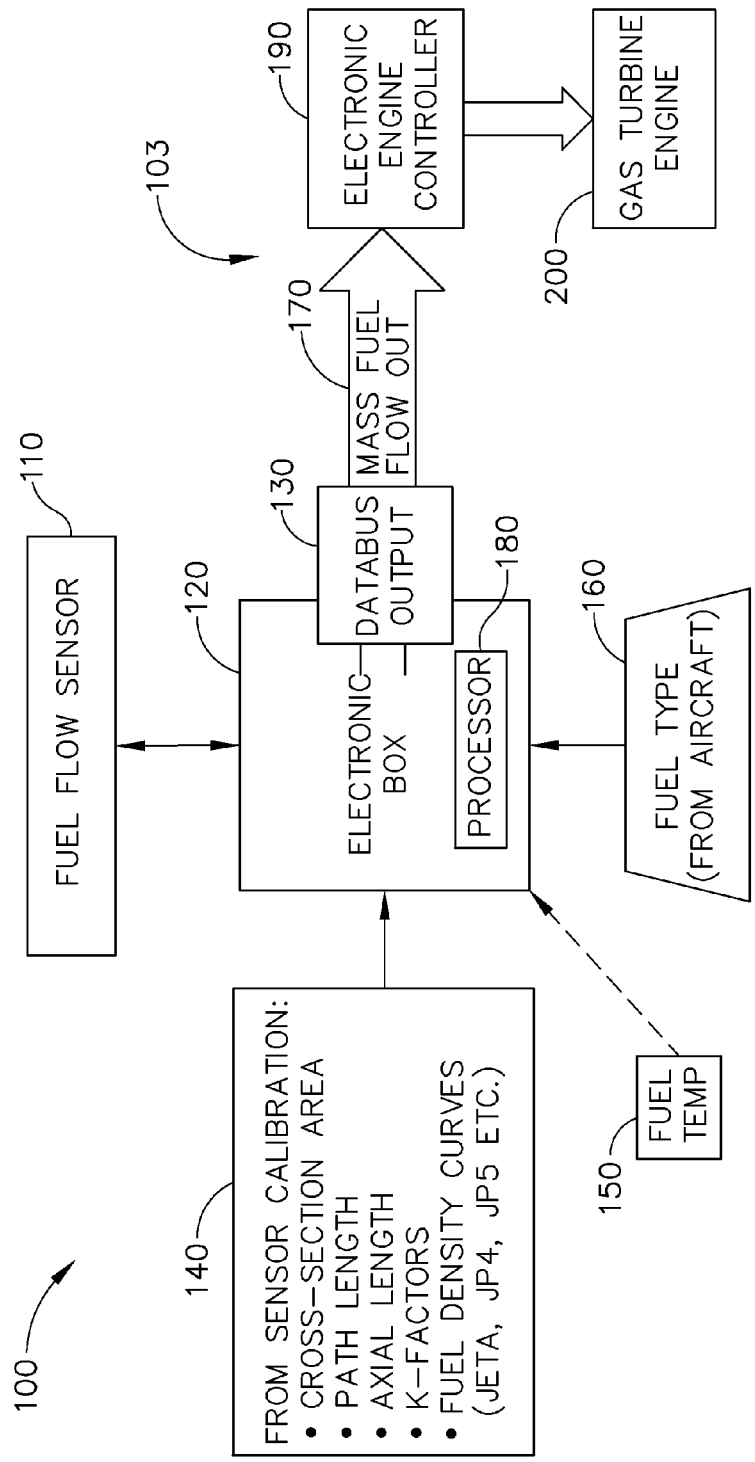
FIG. 1 is a block diagram of an example fuel flow measuring system configured for use on an aircraft engine.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

The present disclosure includes, inter alia, methods and apparatus for fuel flow measuring systems, and, more particularly, methods and apparatus for measuring liquid fuel flows within a conduit.

The present disclosure contemplates that ultrasonic flow meters may be used in place of other flow meters, which may reduce the pressure drop as well as the length of conduit that is required. However, the accuracy of the flow measurement of an ultrasonic flow meter may be limited if there is not a sufficient length of pipe between ultrasonic transducers. Some example offset flow meter configurations may allow for a greater length of pipe between transducers, however also may typically incur a pressure drop and possibly separation of the fuel from the inner wall of the flow meter. Furthermore, the measurement interval at which the transducers are operated is commonly insufficient to allow the fuel flow meter to be used to control a device or machine to which fuel is flowing.

The present disclosure contemplates that, in some circumstances, it may be difficult to measure a liquid fuel flow accurately in a way that does not substantially impede or hinder the flow. Accordingly, ultrasonic sensors may be a favorable solution in some circumstances. For example, upstream and downstream ultrasonic sensors which can act both as signal transmitters and receivers may be placed across a flow path in a way that the line connecting the two sensors (e.g., the signal path) contains at least a small component of the fuel flow direction. Signal transit times may be calculated to determine how long it takes the signal to move from the upstream to the downstream sensor and vice versa. The signal transit times may be measured using, for example, a clock or timer integrated into the fuel flow measuring system processor or electronic box. The difference between the signal transit times may then be used to calculate how fast the liquid fuel is moving. This approach may involve installation of the sensors followed by system calibration. There may be little to no impedance on the fuel flow created by the ultrasonic signals. However, merely arriving at a fuel velocity may not translate to knowing the mass flow when there may be substantial fluctuations in the fuel density, for example.

The present disclosure contemplates that, in some circumstances, some fuel flow measuring systems and devices may include several moving parts which may get worn out over time, stuck or impacted if used within a system which itself is moving (for example on an aircraft or locomotive which may periodically create environments of high inertial or gravitational forces). Accordingly, ultrasonic sensors may be a favorable solution in some circumstances. For example, upstream and downstream ultrasonic sensors may be placed rigidly in fixed locations relative to a flow conduit to minimize relative movement between the conduit and the sensors. Ultrasonic signals or pulses may be transmitted across the flow path eliminating the necessity of having any moving solid or mechanical parts.

Some example embodiments according to at least some aspects of the present disclosure may include using one or more known fuel properties of a fuel in connection with one or more measured fuel properties to translate a fuel velocity to a fuel mass flow rate. An example may include measuring the fuel temperature of a known jet fuel and deriving the fuel density, sound speed, and/or attenuation coefficient based on the category of fuels in which the fuel falls.

In some example embodiments according to at least some aspects of the present disclosure, the ultrasonic sensors may be substantially internal to the pipe and/or conduit with the signal path generally parallel (or generally orthogonal to) the direction in which fuel is flowing. An example may include a configuration in which the ultrasonic sensors are located generally concentrically within a pipe, with fuel flowing past the sensors in the annulus between the sensors and the inner wall of the pipe.

In some example embodiments according to at least some aspects of the present disclosure, the pipe and/or conduit may be in a generally U-shaped configuration in which an inlet portion forms a non-zero angle with a center portion which forms a non-zero angle with an exit portion. An example may include a configuration in which the ends of the center portion contain the two ultrasonic transducers, allowing for sufficient signal path length between the two sensors. Another example may include an S-shaped configuration in which the inlet and exit portions are substantially parallel or orthogonal to each other while the center portion is rotated relative to the inlet and exit portions. Another example of an S-shaped configuration may include contouring of the pipe or conduit near the transition between the inlet and center portions as well as contouring of the pipe or conduit near the transition between the center and exit portions of the pipe or conduit, in order to reduce or eliminate separation of the fuel flow from the inner walls of the pipe or conduit.

In some example embodiments according to at least some aspects of the present disclosure, the measurement interval at which the ultrasonic sensors are run may be short enough to allow the sensors to be used in connection with an electronic engine controller. An example may include an application where the fuel flow measuring system is used on an aircraft engine and the sensor measurement interval is short enough so that it matches or exceeds the update rate of the aircraft engine control system allowing the sensors to be used as inputs to the control system of the aircraft engine. The present disclosure contemplates that some prior uses of ultrasonic sensors may include an ultrasonic sensor measurement interval in the range of about 0 to about 10 Hz, such as may be dictated by the accuracy requirements of the system in which the sensors are being used. By using an ultrasonic sensor operating with a shorter measurement interval (e.g., in the range of about 50 to about 200 Hz and/or, more specifically, such as in the range of about 80 to about 120 Hz) the ultrasonic sensor measurement interval may be short enough so that the sensor may be used in the inner control feedback loop of an aircraft engine control system. The measurement interval at which ultrasonic sensors may be run may depend at least partially on the ultrasonic path length as well as on the processing power of the processor that is used which must be configured to receive data at the desired measurement interval. For example, an ultrasonic path length in the range of about 0 to about 12 inches may allow the signal to travel through the flow path fast enough to ensure the required system accuracy is maintained, since the distance through which the signal must travel is not exceedingly long. Similarly, another example may include an application where the fuel flow measuring system is used on a locomotive engine and the sensor measurement interval is short enough so that it matches or exceeds the update rate of the locomotive electronic engine controller allowing the sensors to be used as inputs to the locomotive electronic engine controller. It should be well understood that the methodologies and apparatuses described herein are also applicable to other types of gas turbine engines as well as other types of internal combustion engines. In each of the above cases, it may be favorable to design a configuration where the desirable angles of rotation, signal path length, sensor measurement intervals and/or flow section contouring are achieved.

As discussed herein, there may be practical constraints on many of the design parameters such as angle, lengths and measurement interval. For example and without limitation, it may be desirable to design a sensor with an angle of rotation that corresponds to a minimum angle that still allows sufficient length of the center portion of the conduit necessary to achieve the required measurement accuracy. Similarly, it may desirable to design a sensor with a minimum sensor measurement interval at which the fuel flow measuring system may be used as a control input. In addition, it may be desirable to design a sensor with a minimal length of curvature required to ensure that an acceptable level of flow separation is maintained, so as to avoid excessive fuel pressure drop.

Some example embodiments according to at least some aspects of the present disclosure may be arranged for use in connection with aircraft engines. FIG. 1 is a block diagram of an example fuel flow measuring system 100, which may be configured to measure the fuel flowing to an aircraft engine, according to at least some aspects of the present disclosure. The fuel flow measuring system 100 may include ultrasonic fuel flow sensors 110, an electronic box 120 including a processor 180, and a data bus output 130. The fuel flow measuring system 100 may be configured to receive data 140 from the sensor calibration as well as the fuel temperature 150 and the fuel type 160. The fuel flow measuring system may be further configured to compute the mass flow 170 of fuel flowing to the aircraft engine using the processor 180, and output the mass flow via the data bus output 130. The data bus output 130 may be configured to communicate with an electronic engine controller 190 which may be configured to control, for example, a gas turbine engine 200.

Figure 2:
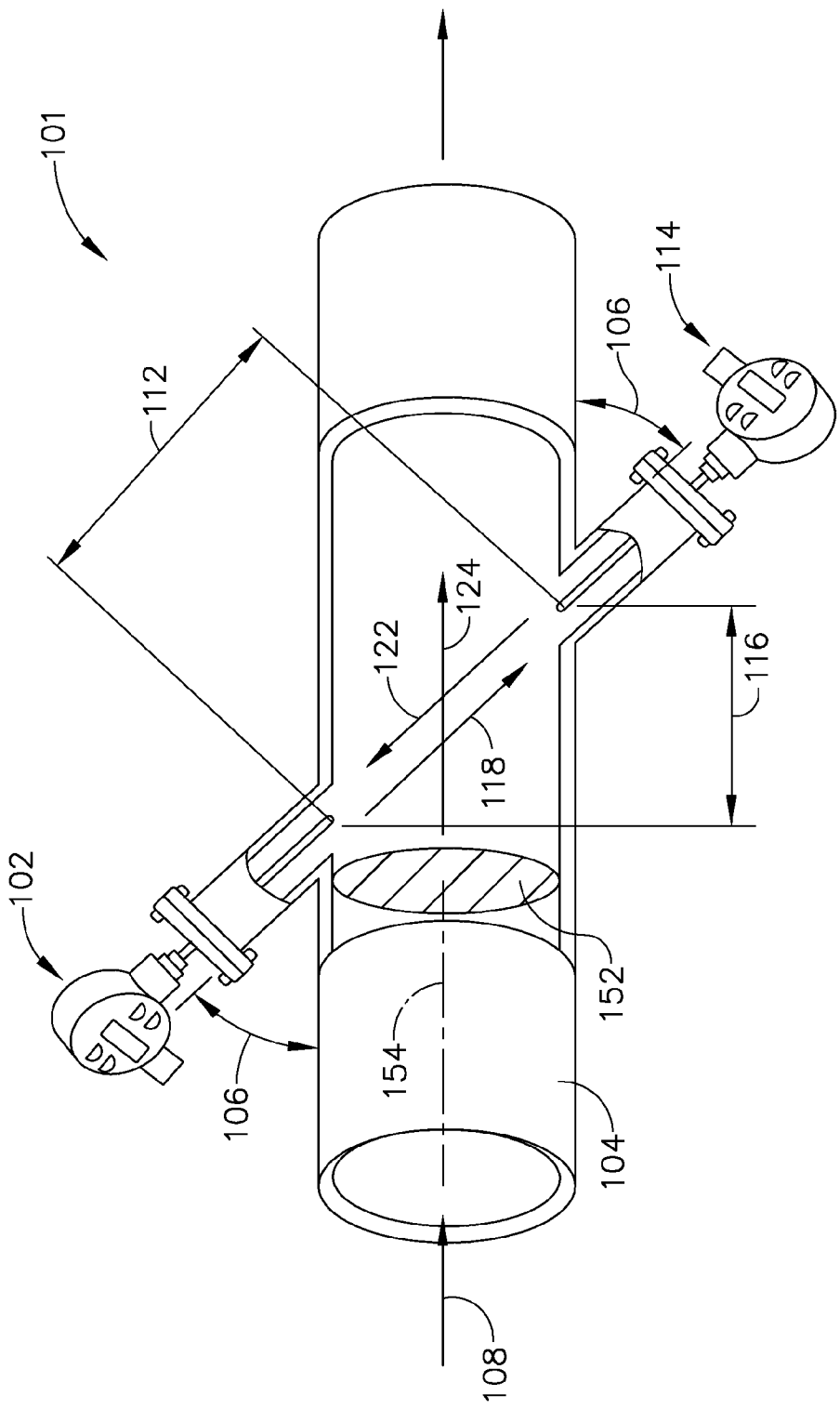
FIG. 2 is a side view of an example ultrasonic fuel flow sensor in a standard configuration.

Some example embodiments according to at least some aspects of the present disclosure may include ultrasonic sensors mounted externally to the pipe or conduit. In some example embodiments, the direction in which the sensors are mounted may form an angle with the pipe or conduit. FIG. 2 is a side view of an example ultrasonic fuel flow sensor 101 in a standard configuration. Fuel flow sensor 101 may comprise the fuel flow sensor 110 of FIG. 1. The upstream ultrasonic transducer 102 may form an angle (θ) 106 with the pipe or conduit 104. This angle may be from about zero to about 90 degrees. However, using an angle of exactly 90 degrees should generally be avoided to ensure that some component of the flow direction 108 is captured in the direction of the signal path length (P) 112. Similarly, the downstream ultrasonic transducer 114 may form an angle 106 with the pipe or conduit 104. The downstream ultrasonic transducer 114 may be located generally on the opposite side of the pipe or conduit 104 and/or may be positioned so that it can act as a receiver for the signal sent by the upstream ultrasonic sensor 102. Similarly, the upstream ultrasonic sensor 102 may also be positioned to act as a receiver for a signal sent by the downstream ultrasonic sensor 114. The downstream transit time (tdn) 118 may refer to the time it takes for the signal that leaves the upstream ultrasonic transducer 102 to reach the downstream ultrasonic transducer 114. Similarly, the upstream transit time (tup) 122 may refer to the time it takes for the signal that leaves the downstream ultrasonic transducer 114 to reach the upstream ultrasonic transducer 102. Generally, for the configuration illustrated in FIG. 2, the ultrasonic signal may be partially attenuated by the fuel flow causing the downstream transit time 118 to be shorter than the upstream transit time 122. In other words, the signal may appear to move "faster" in an at least partially downstream direction than it does in an at least partially upstream direction due to the flow of the fuel through the conduit 104. A downstream direction is the same as the fuel flow direction 108 along the flow axis 154. The flow direction distance between sensors (L) 116 and the flow velocity (V) 124 may each affect the difference between the downstream and upstream transit times (tdn and tup) 118 and 122 respectively. The downstream and upstream transit times 118 and 122 may be measured by the two ultrasonic transducers 102 and 114. The signal path length (P) 112 and the flow direction distance between sensors (L) 116 may be fixed for a given configuration and/or may be calibrated into the system. Thus, the fluid velocity (V) 124 can be calculated as follows:

$$V = \frac{P^2}{2L} * \frac{t_{up} - t_{dn}}{t_{up} * t_{dn}}$$

The mass flow rate of the fuel can then be calculated as follows:

$$M = \rho * V * A$$

Where:
M may refer to the mass flow rate of the fuel;
ρ may refer to the density of the fuel;
V may refer to the velocity of the fuel (e.g., as calculated as described above); and
A may refer to the cross-sectional area of the pipe or conduit. The cross-sectional area of the pipe or conduit (i.e. the flow area 152) may be fixed and thus pre-calibrated into the system. The density, on the other hand, may be determined, such as by using a fuel temperature according to one of the methods described below.

Figure 6:
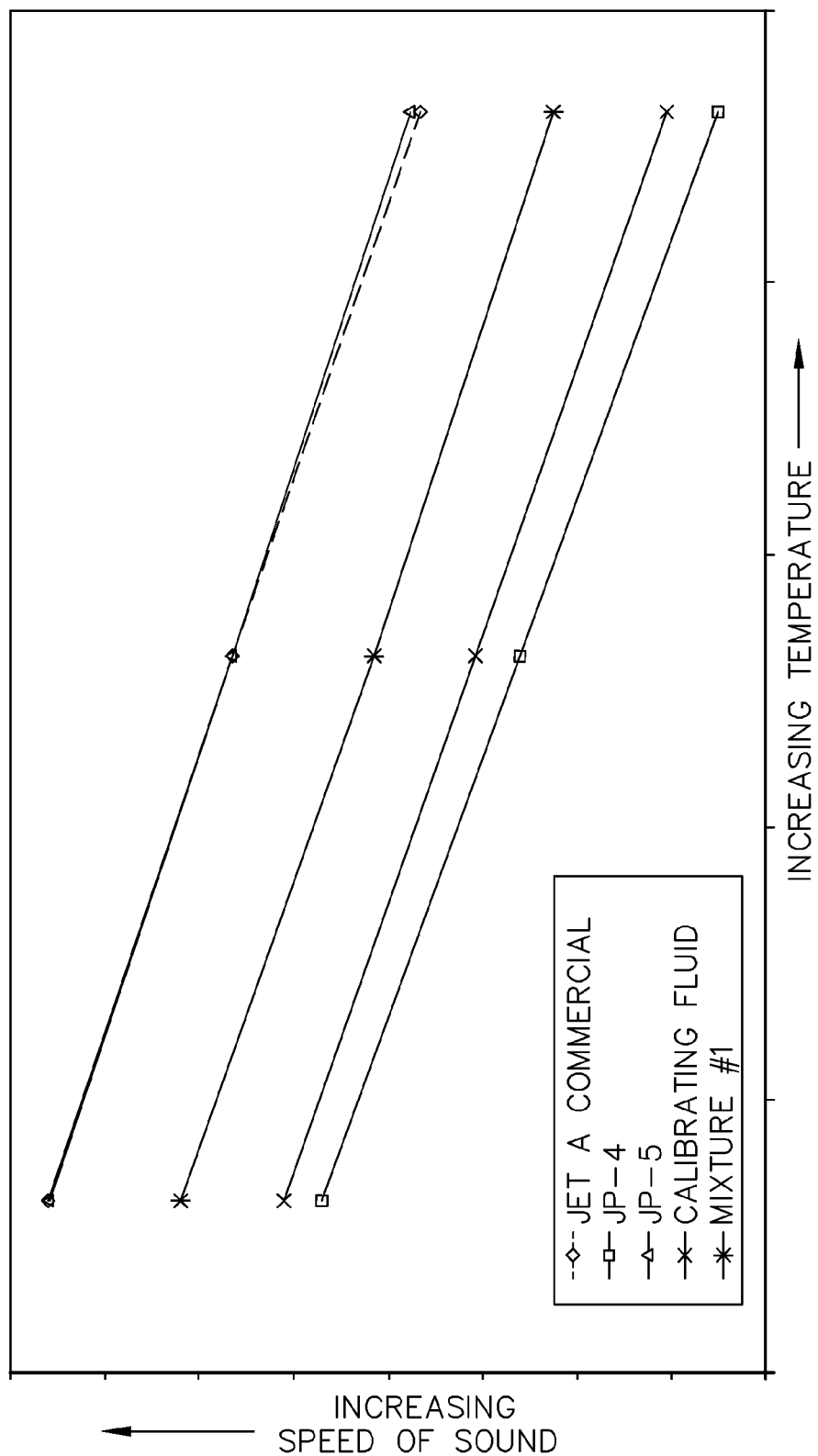
FIG. 6 is an example chart showing sound speed as a function of fuel temperature for various jet fuel types.
Figure 8:
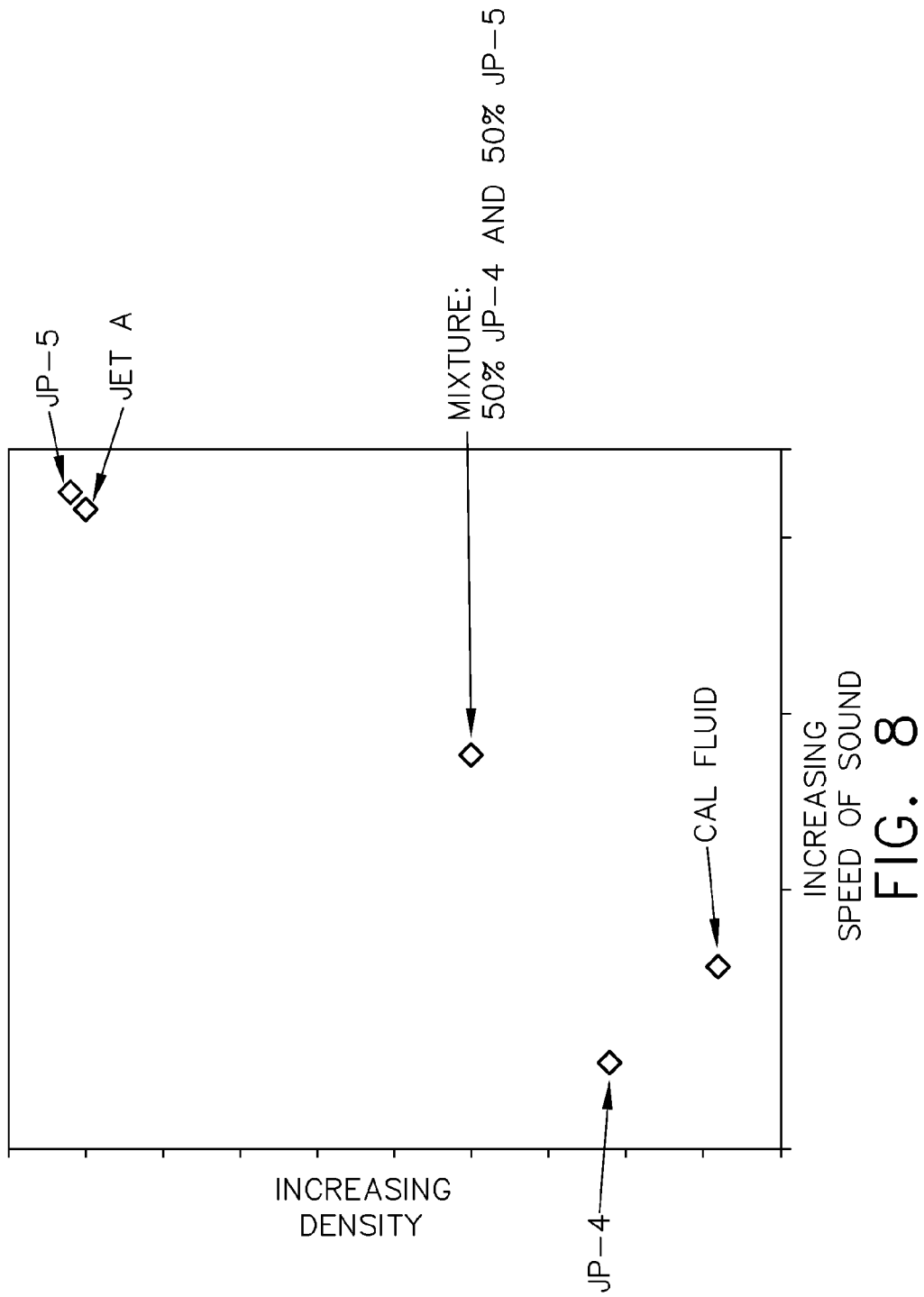
FIG. 8 is an example chart showing density as a function of sound speed for various jet fuel types.

Some example embodiments according to at least some aspects of the present disclosure may include deriving the density of the fuel using a measured temperature, the fuel type and the speed at which sound travels through the fuel. FIG. 6 is an example chart showing sound speed as a function of fuel temperature for various jet fuel types. FIG. 8 is an example chart showing density as a function of sound speed for various jet fuel types. Although the example chart in FIG. 8 corresponds to a single temperature, some example fuel flow measuring systems 100 (e.g., electronic box 120 shown in FIG. 1) may include (or have access to) similar data for a range of fuel temperatures.

Figure 7:
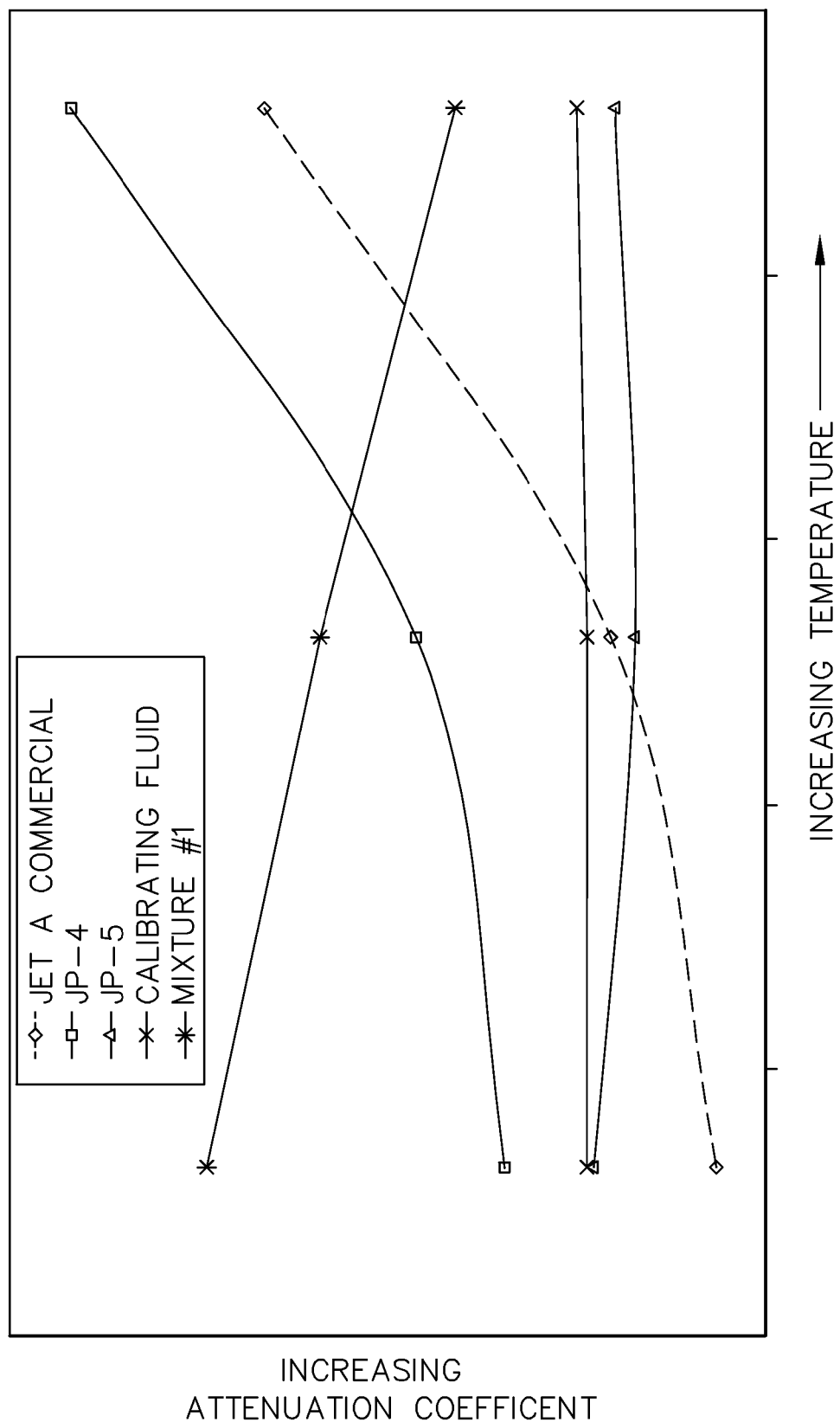
FIG. 7 is an example chart showing attenuation coefficient as a function of fuel temperature for various jet fuel types.
Figure 9:
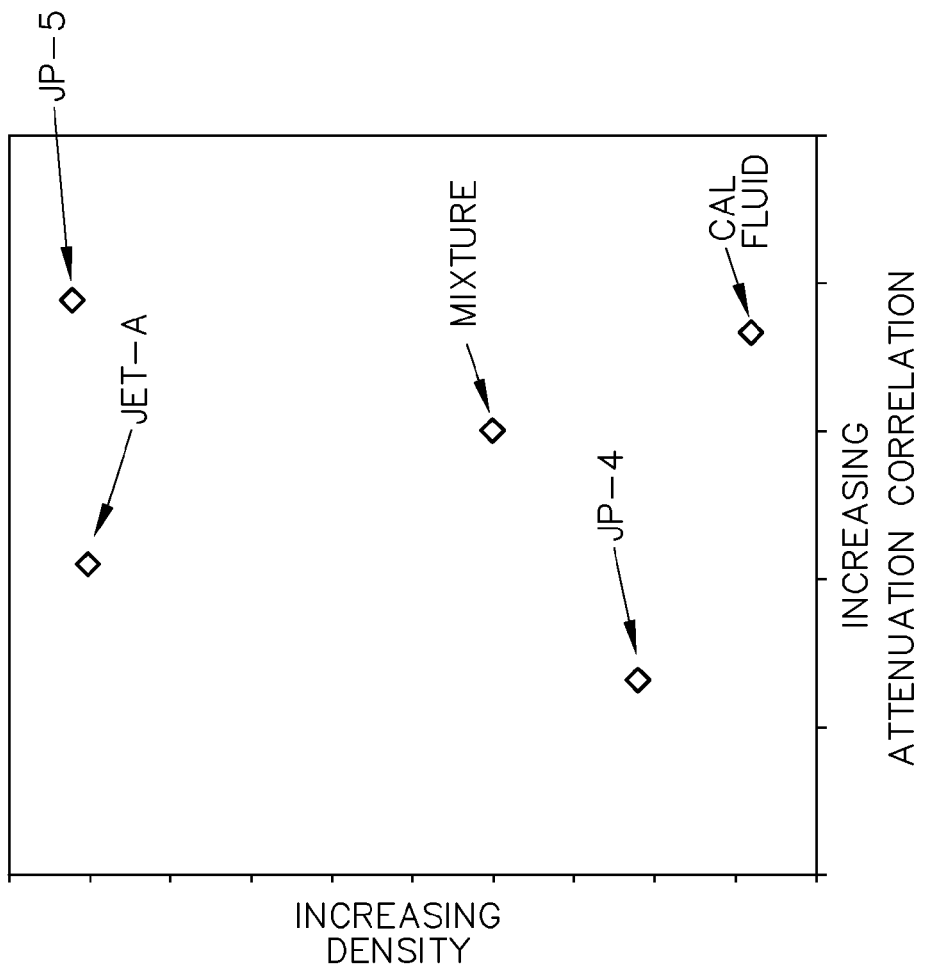
FIG. 9 is a chart showing density as a function of attenuation correlation for various jet fuel types.
Figure 11:
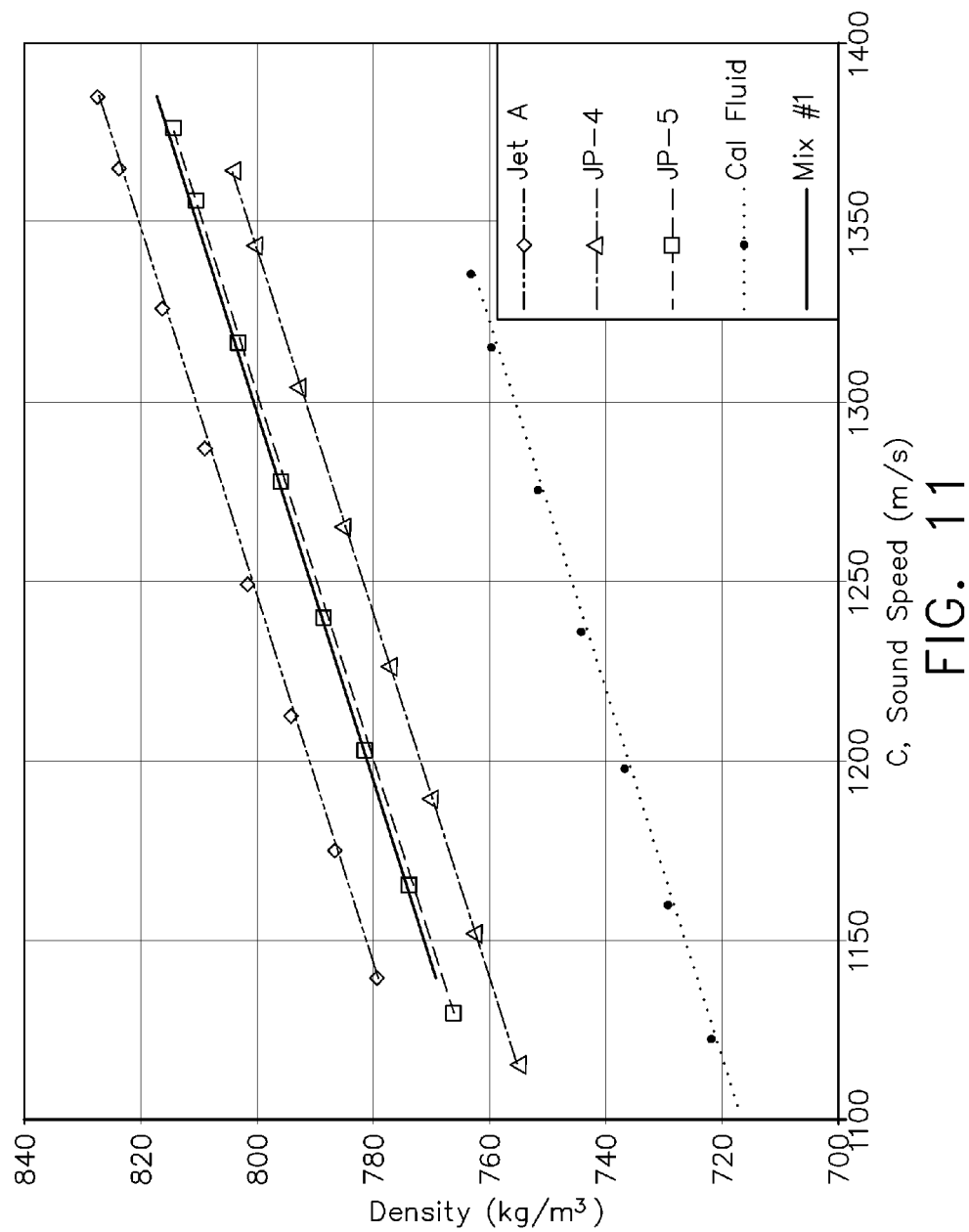
FIG. 11 is an example chart showing the density as a function of fuel type and fuel temperature.

Some example embodiments according to at least some aspects of the present disclosure may include deriving the density of the fuel using a measured temperature, the fuel type and the attenuation coefficient of the fuel. FIG. 7 is an example chart showing the attenuation coefficient as a function of fuel temperature for various jet fuel types. FIG. 9 is an example chart showing density as a function of the attenuation coefficient for various jet fuel types. Although the example chart in FIG. 9 corresponds to a single temperature, some example fuel flow measuring systems 100 (e.g., electronic box 120 shown in FIG. 1) may include (or have access to) similar data for a range of fuel temperatures. Using the data such as is illustrated in FIGS. 6-9 it is possible to derive the fuel density from the fuel temperature by knowing the fuel type and using either the fuel sound speed or the fuel attenuation coefficient and the fuel sound speed. Furthermore, FIG. 11 is an example chart showing the density as a function of fuel type and fuel temperature.

In some example embodiments according to at least some aspects of the present disclosure, the type of fuel being measured may include JET-A, JP-4, JP-5 and/or JP-8. It should be well understood that the fuel types listed herein do not constitute an exhaustive list and a multitude of other fuels with generally predictable fuel properties may be employed as well. Similarly, in some example embodiments according to at least some aspects of the present disclosure, the type of temperature measuring device may include a thermocouple, a thermistor, a resistance temperature detector, a pyrometer, and/or ultrasonic sensors which use the sound speed to measure temperature. For example, the speed at which a pulse that is emitted from an ultrasonic sensor travels through a known fuel may be substantially proportional to the temperature of that fuel. The temperature of the fuel may be derived from how long it takes a signal to carry from one ultrasonic sensor to another ultrasonic sensor. Similarly, the temperature of the fuel may be derived from how long it takes a signal to travel from a sensor to an internal conduit wall then back to the sensor after being reflected off the wall. Again, it should be well understood that these types of temperature measuring devices do not constitute an exhaustive list and a multitude of other temperature measuring devices may be employed as well.

Figure 3:
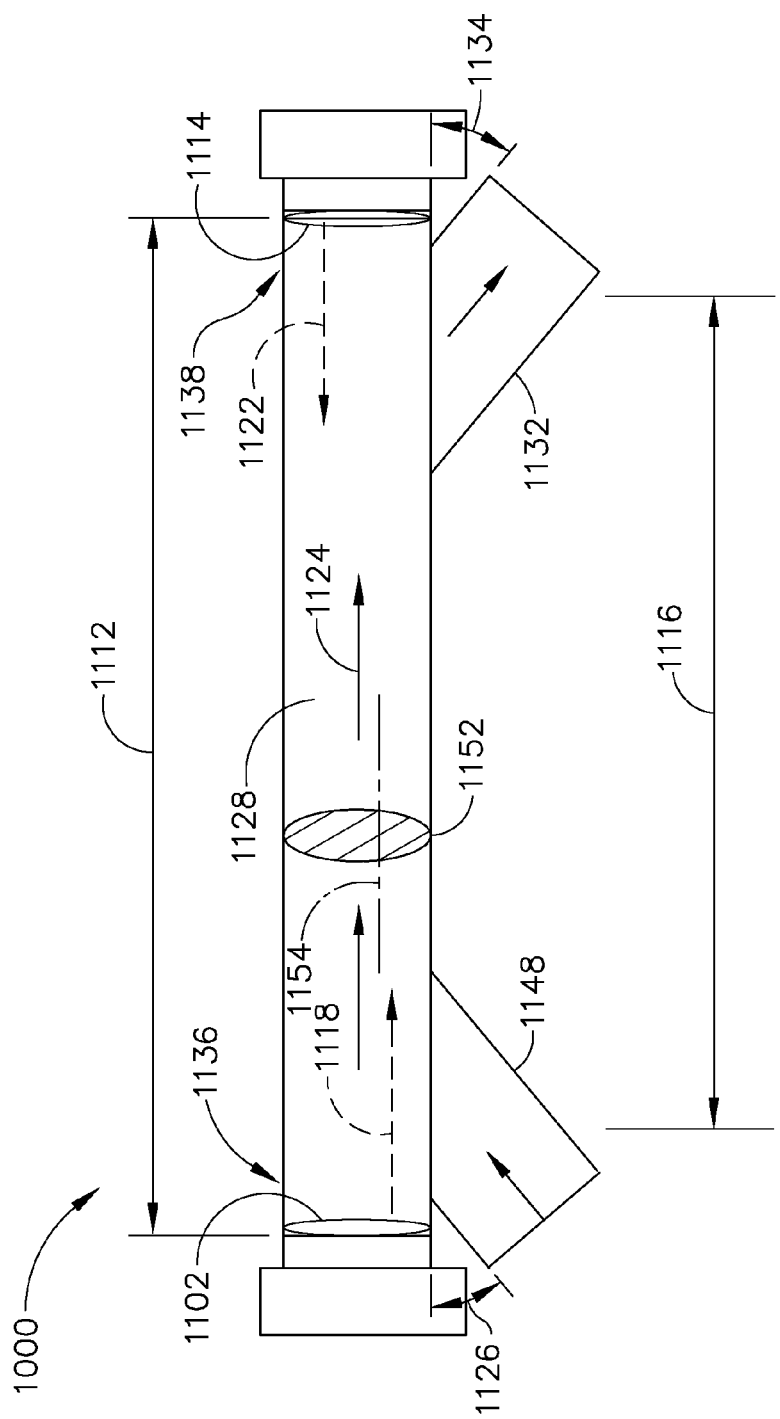
FIG. 3 is a side view of an example ultrasonic fuel flow sensor in an offset U-shaped configuration.

In some example embodiments according to at least some aspects of the present disclosure, a fuel flow measuring system 100 may include an offset flow meter where the inlet and exit portions of the pipe or conduit are not collinear with the center portion of the fuel flow sensor 110. FIG. 3 is a side view of an example ultrasonic fuel flow sensor 1000 in an offset U-shaped configuration in which the conduit inlet portion 1148 may form a non-zero angle 1126 with the conduit center portion 1128. Fuel flow sensor 1000 may comprise the fuel flow sensor 110 of FIG. 1. Similarly, the conduit exit portion 1132 may also form a non-zero angle 1134 with the conduit center portion 1128. The upstream ultrasonic transducer 1102 is at the first end 1136 of the conduit center portion 1128 while the downstream ultrasonic transducer 1114 is at the second end 1138 of the conduit center portion 1128. A signal path length (P) 1112, a fuel flow velocity (V) 1124 and a flow direction distance between sensors (L) 1116 are shown dimensionally on FIG. 3 in the offset U-shaped configuration and may be used to calculate the mass flow rate of fuel generally in the same way they would be used in the configuration shown in FIG. 2 and as described in the paragraphs above. Similarly, the downstream transit time 1118 and the upstream transit time 1122 are also shown in FIG. 3. A downstream direction may be generally in the direction along the flow axis 1154 in the direction of flow of the fuel. A pipe cross sectional area or flow area 1152 is also shown which may be used to convert the fuel flow velocity into a mass flow rate per the equation shown in paragraph 0022 above.

Figure 4:
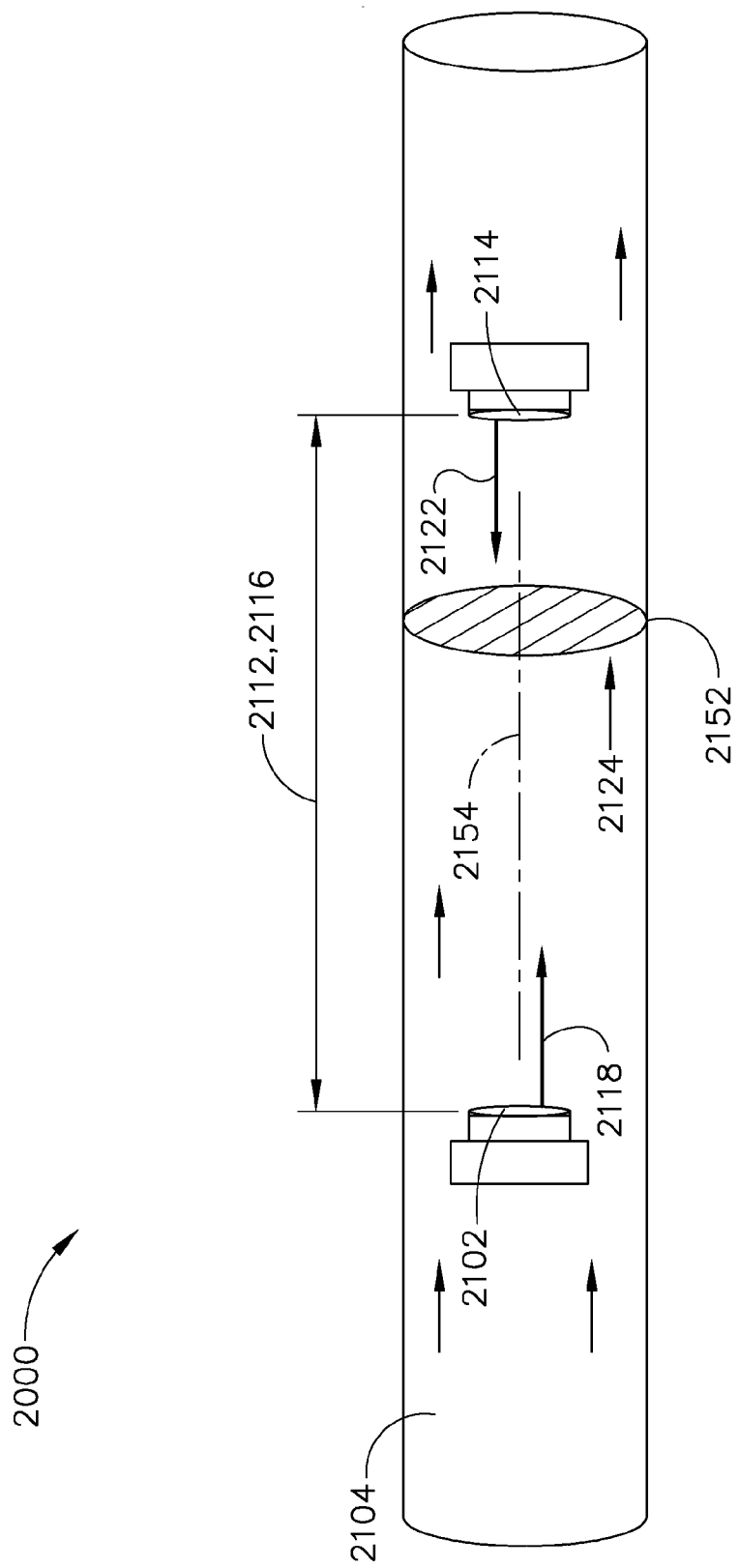
FIG. 4 is a side view of an example ultrasonic fuel flow sensor in an inline-configuration.

In some example embodiments according to at least some aspects of the present disclosure, a fuel flow measuring system 100 may include a fuel flow sensor 2000 generally in the form of an inline flow meter where the upstream ultrasonic transducer 2102 and the downstream ultrasonic transducer 2114 are substantially internal to the pipe or conduit 2104. FIG. 4 is a side view of an example ultrasonic fuel flow measuring system in an inline-configuration in which the signal path direction and the fuel flow direction are generally parallel. Fuel flow sensor 2000 may comprise the fuel flow sensor 110 of FIG. 1. A signal path length (P) 2112, a fuel flow velocity (V) 2124 and a flow direction distance between sensors (L) 2116 are shown dimensionally on FIG. 4 in the inline configuration and are may be used to calculate the mass fuel flow in generally the same way they would be used in the configuration shown in FIG. 2. Similarly, the downstream signal transit time 2118 and the upstream signal transit time 2122 are also shown in FIG. 4. It should be noted that in the inline configuration, the flow direction distance between sensors (L) 2116 and the signal path length (P) 2112 may be of equal lengths. A downstream direction may be generally in the direction along the flow axis 2154 in the direction of flow of the fuel. A pipe cross sectional area or flow area 2152 is also shown which may be used to convert the fuel flow velocity into a mass flow rate per the equation shown in paragraph 0022 above.

Figure 5:
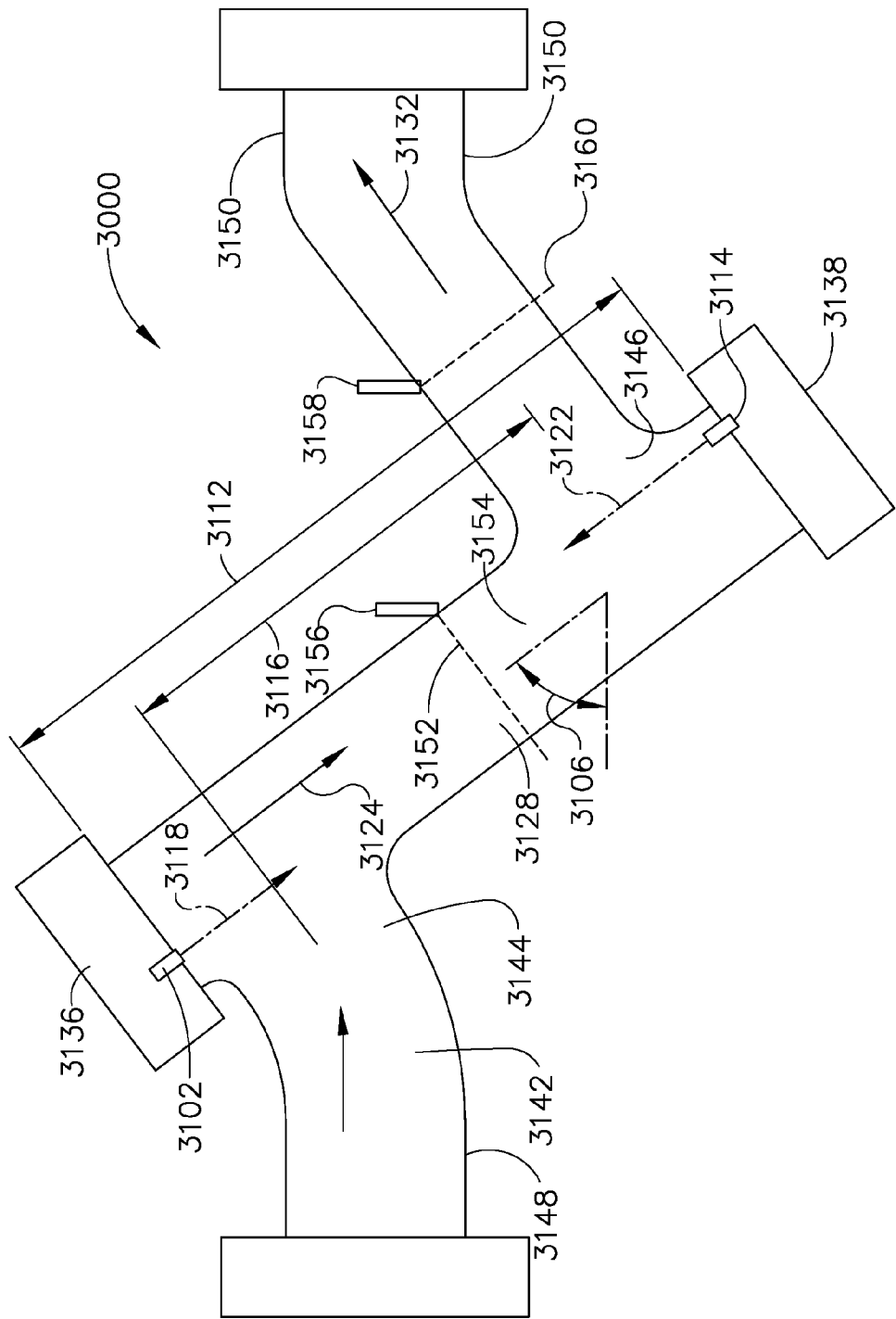
FIG. 5 is a side view of an example ultrasonic fuel flow measuring system in an offset S-shaped configuration.

In some example embodiments according to at least some aspects of the present disclosure, a fuel flow measuring system 100 may include a fuel flow sensor 3000 having a generally S-shaped configuration in which a conduit center portion 3128 is rotated relative to a conduit inlet portion 3148 and a conduit exit portion 3132. FIG. 5 is a side view of an example ultrasonic fuel flow sensor 3000 in an offset S-shaped configuration where the conduit inlet portion 3148 forms an angle 3106 with the conduit center portion 3128. Fuel flow sensor 3000 may comprise the fuel flow sensor 110 of FIG. 1. Similarly, the conduit center portion 3128 also forms an angle 3106 with the conduit exit portion 3132 which may be substantially collinear and/or parallel with the conduit inlet portion 3148. The upstream ultrasonic transducer 3102 is at the first end 3136 of the conduit center portion 3128 while the downstream ultrasonic transducer 3114 is at the second end 3138 of the conduit center portion 3128. A signal path length (P) 3112, a fuel flow velocity (V) 3124 and a flow direction distance between sensors (L) 3116 are shown dimensionally on FIG. 5 in the offset S-shaped configuration and may be used to calculate the mass flow rate of fuel in generally the same way they would be used in the configuration shown in FIG. 2 and as described in the paragraphs above. Similarly, the downstream transit time 3118 and the upstream transit time 3122 are also shown in FIG. 5. A first transition area 3144 between the conduit inlet portion 3148 and the conduit center portion 3128 includes contouring 3142 on the inner walls of the conduit to prevent or reduce separation of the flow. Similarly, a second transition area 3146 between the conduit center portion 3128 and the conduit exit portion 3132 includes contouring 3150 on the inner walls of the conduit to prevent or reduce separation of the flow and thus reduce drag. A downstream direction may be generally the direction along the flow axis 3154 in the direction of flow of the fuel. A pipe cross sectional area or flow area 3152 is also shown which may be used to convert the fuel flow velocity into a mass flow rate per the equation shown in paragraph 0022 above. A Venturi redundant fuel measurement system also appears in FIG. 5. An upstream pressure tap 3156 measures the fuel flow pressure upstream of a flow constriction 3160 proximate the second transition area 3146. Similarly, a downstream pressure tap 3158 measures the fuel flow pressure downstream of the flow constriction proximate 3160 the second transition area 3146. Using the upstream and downstream fuel pressure taps, 3156 and 3158 respectively, a differential pressure can be calculated and used to derive a redundant or secondary fuel flow measurement.

In some example embodiments according to at least some aspects of the present disclosure, a fuel flow measuring system 100 may include a fuel flow sensor 3000 having a generally S-shaped configuration in which upstream and downstream pressure taps, 3156 and 3158 are used to calculate a differential pressure across a flow constriction 3160. Paragraph 22 above describes how the volumetric flow rate can be calculated based on the upstream transit time 122, the downstream transit time 118, the signal path length (P) 112 and the flow direction distance between sensors (L) 116. Then using the fuel type and fuel temperature, the fuel density can be derived and a mass flow rate can be calculated as explained in paragraph 23. However, in systems where a flow constriction 3160 and both upstream and downstream pressure taps (3156 and 3158 respectively) are present, it's possible to calculate the mass flow rate even without knowing the fuel type. The fuel density can be calculated from the differential pressure as follows:

$$\rho = (2 \times \Delta P / (V2 - V12))$$

$$V \times A = V_1 \times A_1$$

Where,

A=upstream pipe cross-sectional area, 3152

A1=Pipe cross-sectional area at the location of flow constriction, 3160

V=fluid velocity at upstream location (calculated using ultrasonic sensors as described in paragraph 22 above), and $\Delta P$=upstream pressure−downstream pressure.

The mass flow rate can then be calculated from the density using the equation in paragraph 23. It should be noted that the accuracy of this flow measurement decreases at low flow rates as the differential pressure between the upstream and downstream pressure taps approaches zero. However, the measurement is very accurate at higher flow rates, such as the fuel flow rates an aircraft engine experiences during takeoff at the very beginning of a flight. Hence, using this method, the density of the fuel can be established accurately during takeoff at the beginning of the flight. Thereafter, the ultrasonic flow meters can be used in connection with the density to accurately calculate the mass flow rate throughout the flight, even when the engines are operating at lower fuel flow rates. In addition, referring to FIG. 11, it is apparent that even when the exact mix of aviation grade jet fuels is not known, the relationship between density and sound speed is predictable. In other words, using a mixture of jet fuels will shift the lines shown in FIG. 11 up or down such that the slope is the same and the line remains parallel to those of the known jet fuels. Thus, if the density of a mix of fuels is determined at a single sound speed, the density can be derived using FIG. 11 for the full range of sound speeds.

Figure 10:
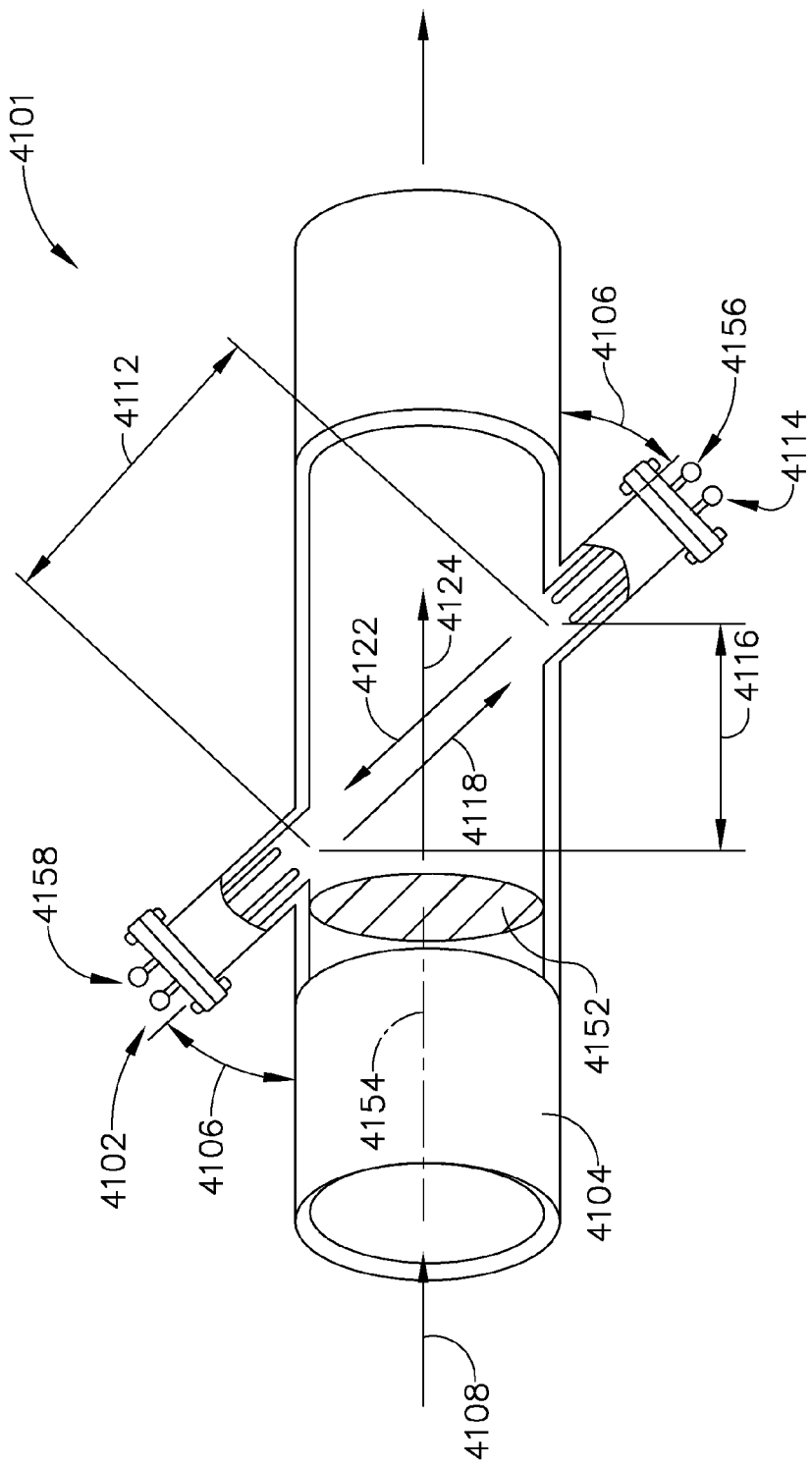
FIG. 10 is a side view of an example ultrasonic fuel flow sensor in a configuration with separate transmitters and receivers, all in accordance with at least some aspects of the present disclosure

Some example embodiments according to at least some aspects of the present disclosure may include ultrasonic sensors mounted externally to the pipe or conduit. In some example embodiments, the direction in which the sensors are mounted may form an angle with the pipe or conduit. FIG. 10 is a side view of an example ultrasonic fuel flow sensor 4101 in a configuration with separate transmitters and receivers. Fuel flow sensor 4101 may comprise the fuel flow sensor 110 of FIG. 1. The upstream ultrasonic transducers 4102 and 4158 may form an angle ($\theta$) 4106 with the pipe or conduit 4104. This angle may be from about zero to about 90 degrees, for example. However, using an angle of substantially 90 degrees may be avoided to ensure that some component of the flow direction 4108 is captured in the direction of the signal path length (P) 4112. Similarly, the downstream ultrasonic transducers 4114 and 4156 may form an angle 4106 with the pipe or conduit 4104. The downstream ultrasonic transducer 4114 may be located generally on the opposite side of the pipe or conduit 4104 and/or may be positioned so that it can act as a receiver for the signal sent by the upstream ultrasonic transducer 4102. Similarly, the upstream ultrasonic sensor 4158 may be positioned to act as a receiver for a signal sent by the downstream ultrasonic sensor 4156. The downstream transit time (tdn) 4118 may refer to the time it takes for the signal that leaves the upstream ultrasonic transducer 4102 to reach the downstream ultrasonic transducer 4114. Similarly, the upstream transit time (tup) 4122 may refer to the time it takes for the signal that leaves the downstream ultrasonic transducer 4156 to reach the upstream ultrasonic transducer 4158. Generally, for the configuration illustrated in FIG. 10, the ultrasonic signal may be partially attenuated by the fuel flow causing the downstream transit time 4118 to be shorter than the upstream transit time 4122. In other words, the signal may appear to move "faster" in an at least partially downstream direction than it does in an at least partially upstream direction due to the flow of the fuel through the conduit 4104. A downstream direction may be generally the same as the fuel flow direction 4108 along the flow axis 4154. The flow direction distance between sensors (L) 4116 and the flow velocity (V) 4124 may each affect the difference between the downstream and upstream transit times (tdn and tup) 4118 and 4122 respectively. The downstream and upstream transit times 4118 and 4122 may be measured by the four ultrasonic transducers 4102, 4114, 4156 and 4158. The signal path length (P) 4112 and the flow direction distance between sensors (L) 4116 may be fixed for a given configuration and/or may be calibrated into the system. A pipe cross sectional area or flow area 4152 is also shown which may be used to convert the fuel flow velocity into a mass flow rate per the equation shown in paragraph 0022 above.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A fuel flow measuring system comprising:
a conduit arranged to flow fuel therethrough substantially along a flow axis,
a first transducer arranged to direct a first signal through the conduit proximate the flow area to a second transducer, the second transducer being arranged to direct a second signal through the conduit proximate the flow area to the first transducer, the first transducer being spaced apart from the second transducer by a signal path length, the first transducer and the second transducer being spaced apart in a direction parallel to the flow axis by an axial distance; and
a processor for calculating a fuel mass flow rate through the conduit based at least in part on a first signal transit time for the first signal to travel from the first transducer to the second transducer, a second signal transit time for the second signal to travel from the second transducer to the first transducer, one or more known differential pressure of fuel flow properties or at least one of fuel type and attenuation coefficient of fuel properties, and a fuel temperature.

2. The fuel flow measuring system of claim 1, wherein the fuel properties comprises density.

3. The fuel flow measuring system of claim 1, further comprising a fuel temperature sensor operatively coupled to provide a fuel temperature signal associated with the fuel temperature.

4. The fuel flow measuring system of claim 1, wherein the fuel temperature sensor comprises at least one of a resistance temperature detector, a thermocouple, a thermistor, a pyrometer, and one or more ultrasonic sensors which use the sound speed to measure temperature.

5. The fuel flow measuring system of claim 1, wherein the fuel comprises at least one of Jet-A, JP5, JP8, and JP4.

6. The fuel flow measuring system of claim 1, wherein the signal path length is disposed at an acute or obtuse angle with respect to the flow axis.

7. The fuel flow measuring system of claim 1, wherein the conduit comprises an inlet portion disposed at a first angle with respect to the flow axis and an outlet portion disposed at a second angle with respect to the flow axis.

8. An engine control system comprising:
an electronic engine controller configured to operate at an update rate;
a fuel flow measuring system operatively coupled to provide a fuel mass flow rate signal to the electronic engine controller, the fuel flow measuring system comprising
a conduit through which fuel can flow,
at least one fuel temperature sensor arranged to measure a fuel temperature associated with fuel flowing through the conduit,
a first ultrasonic transducer and a second ultrasonic transducer arranged to direct ultrasonic signals through at least a portion of the conduit, the second ultrasonic transducer facing said first ultrasonic transducer, the first and second transducers operating at a transducer measurement interval, and
a processor configured to calculate a mass flow rate of fuel through the conduit based at least in part on a first signal transit time for a first signal to travel from the first ultrasonic transducer to the second ultrasonic transducer, a second signal transit time for a second signal to travel from the second ultrasonic transducer to the first ultrasonic transducer, and the fuel temperature;
wherein the transducer measurement interval is substantially the same as or shorter than the update rate the electronic engine controller.

9. The engine control system of claim 8, wherein the transducer measurement interval is between about 25 Hz and about 200 Hz.

10. A fuel flow sensor comprising:
a conduit arranged to convey fuel therethrough, the conduit comprising, from upstream to downstream, a conduit inlet portion, a conduit center portion, and a conduit exit portion, the conduit center portion comprising a first end coupled to the conduit inlet portion and a second end coupled to the conduit exit portion;
a first ultrasonic transducer disposed proximate the first end of the conduit center portion; and
a second ultrasonic transducer disposed proximate the second end of said conduit center portion;
wherein the conduit inlet portion and the conduit exit portion are substantially parallel and the conduit center portion is disposed at a non-zero angle with respect to the conduit inlet portion and the conduit exit portion.

11. The fuel flow sensor of claim 10, wherein the second conduit portion is angled with respect to the first conduit portion and the third conduit portion by greater than about 0 degrees and less than about 90 degrees.

12. The fuel flow sensor of claim 11, wherein the second conduit portion is angled with respect to the first conduit portion and the third conduit portion by greater than about 20 degrees and less than about 70 degrees.

13. The fuel flow sensor of claim 12, wherein the second conduit portion is angled with respect to the first conduit portion and the third conduit portion by greater than about 40 degrees and less than about 60 degrees.

14. The fuel flow sensor of claim 10, wherein a first transition region approximate an intersection of the first conduit portion and the second conduit portion is contoured to reduce flow separation.

15. The fuel flow sensor of claim 10, wherein a second transition region approximate an intersection of the second conduit portion and the third conduit portion is contoured to reduce flow separation.

16. The fuel flow sensor of claim 10, further comprising:
a Venturi disposed in a serial flow arrangement with the conduit; and
a differential pressure transducer operatively arranged to detect a differential pressure across the Venturi.

17. The fuel flow sensor of claim 10, wherein the fuel flow measuring system is arranged to measure the fuel flow entering combustion gas turbine engine.

18. The fuel flow sensor of claim 10, wherein the fuel flow measuring system is arranged to measure the fuel flow entering an aircraft engine.

\* \* \* \* \*